United States Patent [19]
Okamoto

[11] Patent Number: 5,295,186
[45] Date of Patent: Mar. 15, 1994

[54] TERMINATION CIRCUIT FOR A TWO-WIRE TRANSMISSION LINE

[75] Inventor: Toshiyuki Okamoto, Tokyo, Japan

[73] Assignee: NEC Corporation, Tokyo, Japan

[21] Appl. No.: 509,021

[22] Filed: Apr. 13, 1990

[30] Foreign Application Priority Data

Apr. 18, 1989 [JP] Japan ................................ 1-99513

[51] Int. Cl.[5] .............................................. H04M 1/00
[52] U.S. Cl. ..................................... 379/402; 379/399;
379/405; 379/394; 379/398; 370/32.1
[58] Field of Search ............... 379/399, 402, 405, 394,
379/391, 345, 398; 370/32.1

[56] References Cited
U.S. PATENT DOCUMENTS

4,532,384 7/1985 Keriakos et al. ................ 379/398 X
4,633,225 12/1986 Hayashi et al. .................. 379/339 X Primary Examiner—James L. Dwyer
Assistant Examiner—Paul A. Fournier

[57] ABSTRACT

A low-pass filter is inserted between a two-wire line and a four-wire transmitting line for transmitting a transmission signal supplied from the two-wire line. Input and output signals of the low-pass filter are fedback to a subtracter to provide a subtracted signal which is added to an output signal of a terminal impedance resultant filter. Thus, operation is realized in a stable manner even in a high frequency band, in which an output signal of the low-pass filter is rotated in phase by 180°.

3 Claims, 5 Drawing Sheets

TERMINATION CIRCUIT FOR A TWO-WIRE TRANSMISSION LINE

FIELD OF THE INVENTION

This invention relates to a termination circuit for a two-wire transmission line, and more particularly to, a circuit for matching a terminal impedance to a two-wire transmission line in a communication between two and four-wire transmission lines.

BACKGROUND OF THE INVENTION

A termination circuit for a two-wire transmission line has a function of matching a terminal impedance to decrease a reflected signal which is produced by a signal supplied from the two-wire transmission line to a four-wire transmission line, and is transmitted back thereto.

One type of a conventional termination circuit for a two-wire transmission line comprises a low-pass filter of an active filter, an analog to digital converter, a digital to analog converter, a terminal impedance resultant filter of a digital filter, and a feedback line having a feedback amount of "1".

Here, if it is assumed that a line impedance of a two-wire transmission line is Zs, and a transfer function defined by a cascade connection of the low-pass filter, the analog to digital converter, the terminal impedance resultant filter, and the digital to analog converter is $\tilde{H}z$, the best result is obtained in a return-loss characteristic indicating a degree of suppressing the aforementioned reflected signal, when the following equation (1) is met.

$$Hz = -Ro/Zs \quad (1)$$

where Ro is a reference resistance.

Another type of a conventional termination circuit for a two-wire transmission line comprises a low-pass filter of an active filter, a terminal impedance resultant filter of a switched capacitor filter, and a feedback line having a feedback amount of "1".

Here, if it is assumed that a line impedance of a two-wire transmission line is Zs, and a transfer function defined by a cascade connection of the low-pass filter and the terminal impedance resultant filter is $\tilde{H}z$, the best return-loss characteristic is obtained, when the aforementioned equation (1) is met. Such a termination circuit is applied to, for instance, a switch board for a communication between two and four-wire telephone networks.

However, the former and latter termination circuits for a two-wire transmission line has a disadvantage, in that operation becomes instable in a high frequency range, in which a phase of an output signal at the low-pass filter is rotated by 180°. In more detail, the output signal phase begins to be rotated at a frequency more than 80 kHz. Then, the phase is rotated around 100 to 200 kHz by 90°, and at a frequency more than 400 to 500 kHz by 180°. As a result, a negative feedback which is customarily fedback through the terminal impedance resultant filter in accordance with the output signal of the low-pass filter is turned to be a positive feedback in opposition to operation inherent to the circuit.

SUMMARY OF THE INVENTION

Accordingly, it is an object of this invention to provide a termination circuit for a two-wire transmission line operating stably even in a high frequency range, in which an output signal of a low-pass filter is rotated in phase by 180°.

According to this invention, a termination circuit for a two-wire transmission line, comprises:
- a low-pass filter connected in series to a four-wire transmitting line for transmitting a signal supplied from a two-wire transmission line;
- a serial connection of first to third adders and a reference resistance connected to a four-wire receiving line for supplying a receipt signal to the two-wire transmission line;
- a terminal impedance resultant filter including a switched capacitor and having an input terminal connected to an output terminal of the low-pass filter and an output terminal connected to an input terminal of the first adder;
- first and second feedback lines having first and second feedback amounts and connected to an input terminal and an output terminal of the low-pass filter respectively;
- a subtracter to input terminals of which the other ends of the first and second feedback lines are connected and having an output terminal connected to the second adder; and
- a third feedback line having one end connected to the input terminal of the low-pass filter.

BRIEF DESCRIPTION OF THE DRAWINGS

This invention will be explained in more detail in conjunction with appended drawings, wherein.

DESCRIPTION OF THE PREFERRED EMBODIMENTS

Before explaining a termination circuit for a two-wire transmission line in the preferred embodiment according to the invention, the aforementioned conventional termination circuits will be explained.

Figure 1:
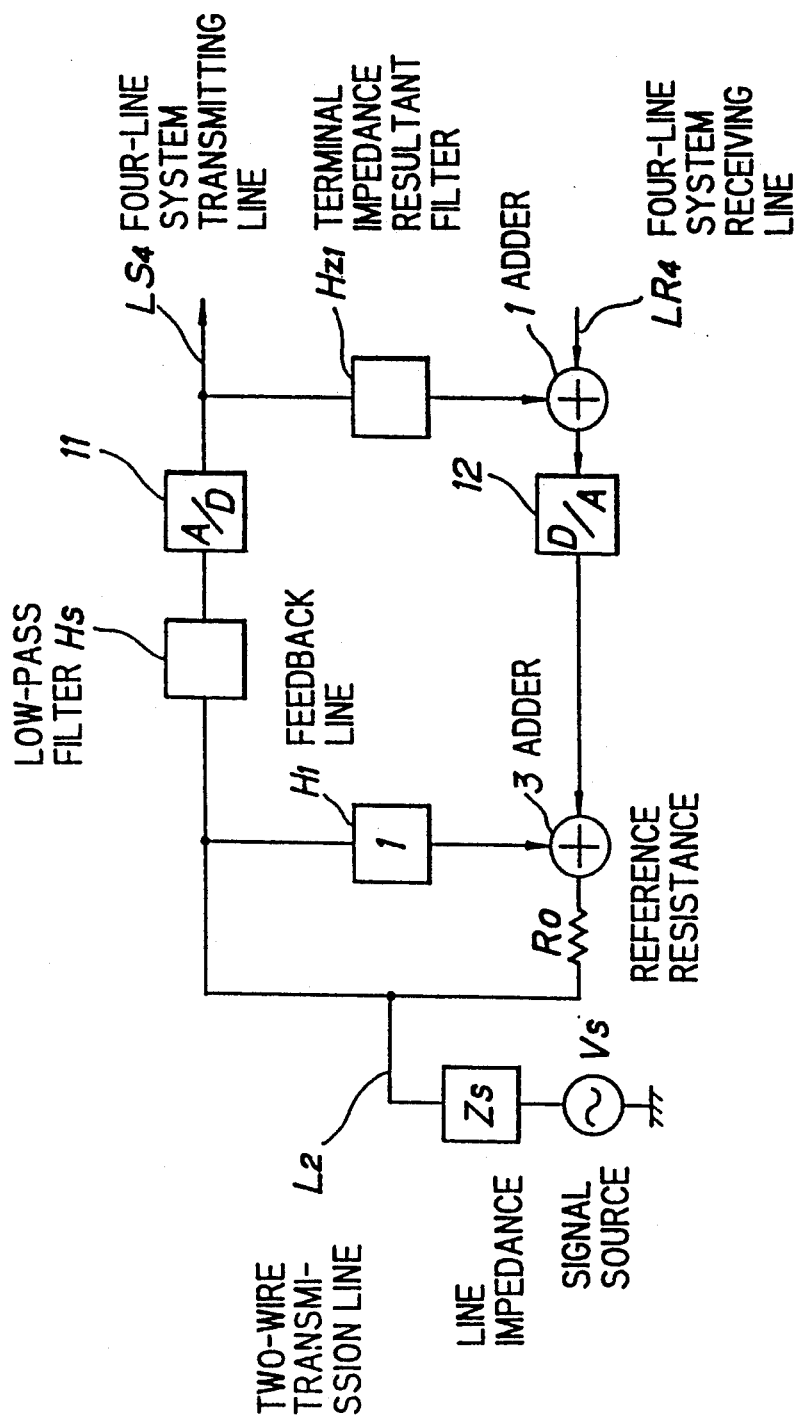
FIGS. 1 and 2 are block diagrams showing conventional termination circuits for a two-wire transmission line.

FIG. 1 shows the former type of the conventional termination circuit for a two-wire transmission line which comprises a cascade connection including a low-pass filter Hs, an analog to digital converter 11, a terminal impedance resultant filter $Hz_1$, and a digital to analog converter 12. A connecting point between the analog to digital converter and the terminal impedance resultant filter $Hz_1$ is connected to a four-wire transmission line $LS_4$, and an output terminal of the terminal impedance resultant filter $Hz_1$ and a four-wire receiving line $LR_4$ are connected to input terminals of an adder 1, an output terminal of which is connected to the digital to analog converter 12. In addition, an input terminal of the low-pass filter Hs is connected to a feedback line $H_1$ having a feedback amount of "1" which is connected to one of input terminals of an adder 3, to the other input terminal of which an output terminal of the digital to analog converter 12, and to an output terminal of which a reference resistance Ro is connected. On the other hand, a two-wire transmission line $L_2$ is connected to an input terminal of the low-pass filter Hs and the reference resistance Ro, and includes a line impedance Zs and a signal source Vs.

Figure 2:
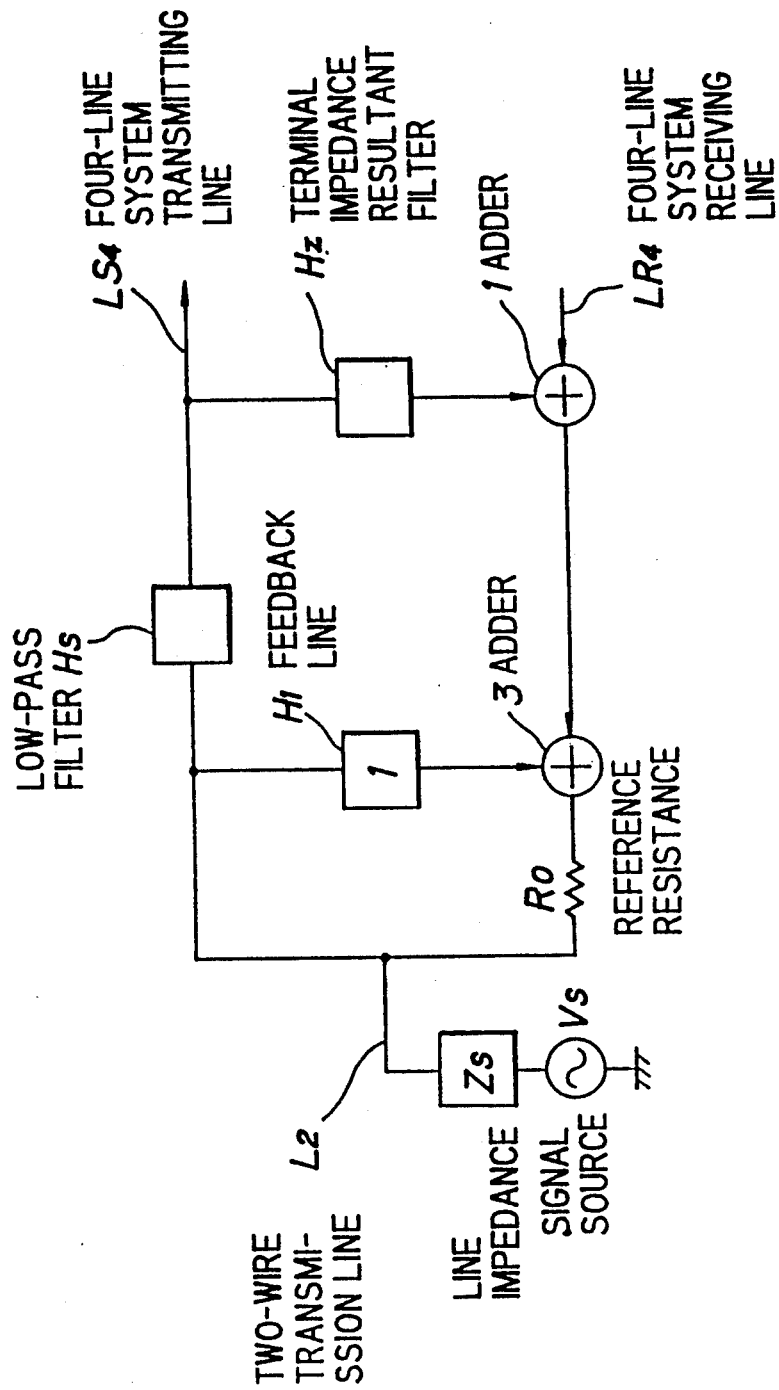

FIG. 2 shows the latter type of the conventional termination circuit for a two-wire transmission line, wherein like parts are indicated by like reference numerals and symbols as used in FIG. 1, except that a terminal impedance resultant filter Hz is of a switched capacitor filter. In this termination circuit for a two-wire transmission line, the analog to digital converter 11 and the digital to analog converter 12 are not used, because analog signals are transmitted through the four-wire transmitting line LS4 and the four-wire receiving line LR4.

Figure 3:
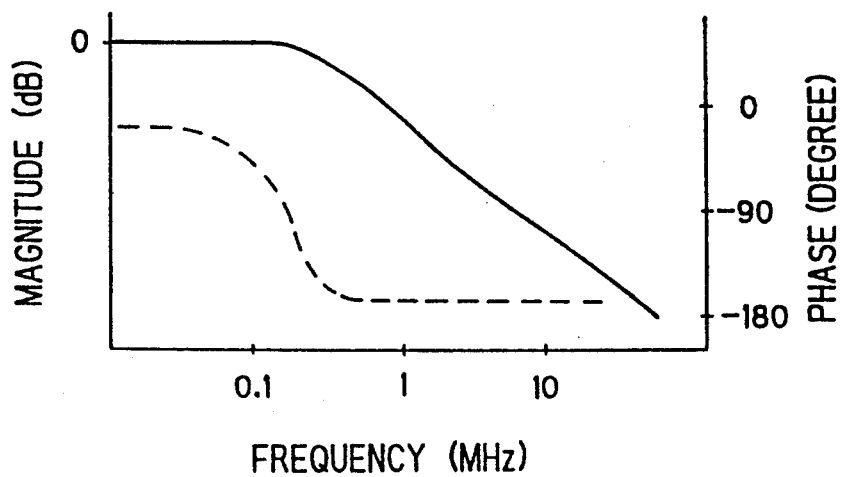
FIG. 3 is an explanatory graph for explaining a rotation of a phase in an output signal of a low-pass filter at a high frequency.

In operation of the termination circuits for a two-wire transmission line, an output signal of the low-pass filter Hs begins to be rotated in phase by exceeding a frequency more than 80 kHz as shown in FIG. 3 by a dotted curve, while a magnitude of the output signal is shown therein by a solid curve. The phase is rotated around 100 to 200 kHz by 90°, and at a frequency more than 400 to 500 kHz by 180°.

Next, a termination circuit for a two-wire transmission line in the first preferred embodiment according to the invention will be explained in FIG. 4, wherein like parts are indicated by like reference numerals and symbols as used in FIGS. 1 and 2.

The termination circuit for a two-wire transmission line comprises a low-pass filter Hs of an active filter connected in series to a four-wire transmitting line LS4 for transmitting a transmission signal supplied from a two-wire transmission line L2, first to third adders 1, 2 and 3, and a reference resistance Ro connected in series to a four-wire receiving line LR4 for supplying a receipt signal to a two-wire transmission line L2, a terminal impedance resultant filter Hz of a switched capacitor having an input terminal connected to an output terminal of the low-pass filter Hs and an output terminal connected to an input terminal of the first adder 1, first and second feedback lines A1 and A2 each having a feedback amount of "1" and connected to an input terminal of the low-pass filter Hs and the output terminal of the low-pass filter Hs, respectively, a subtracter 4 having input terminals connected to the other ends of the feedback lines A1 and A2 and an output terminal connected to an input terminal of the second adder 2, and a third feedback line H1 having a feedback amount of "1" and connected to the input terminal of the low-pass filter and an input terminal of the third adder 3.

In operation, if it is assumed that a characteristic of a loop including the feedback lines A1 and A2 is flat in a frequency band of the low-pass filter Hs, the presence of the loop is negligible in the frequency band. Therefore, a feedback loop is defined only by the third feedback line H1 which is of a high impedance, and the terminal impedance resultant filter Hz, so that the best return-loss characteristic is obtained, when the aforementioned equation (1) is met. On the other hand, a negative feedback of the terminal impedance resultant filter Hz is turned to be a positive feedback in a high frequency region, in which an output signal of the low-pass filter Hs is rotated in phase by 180°. Simultaneously, a feedback of the second feedback line A2 becomes negative to be supplied to the substacter 4, together with a negative feedback of the first feedback line A1, so that a negative feedback is obtained at the second adder 2, even if the positive feedback is supplied to the first adder 1. As a result, the termination circuit operates stably even in the high frequency band.

Figure 4:
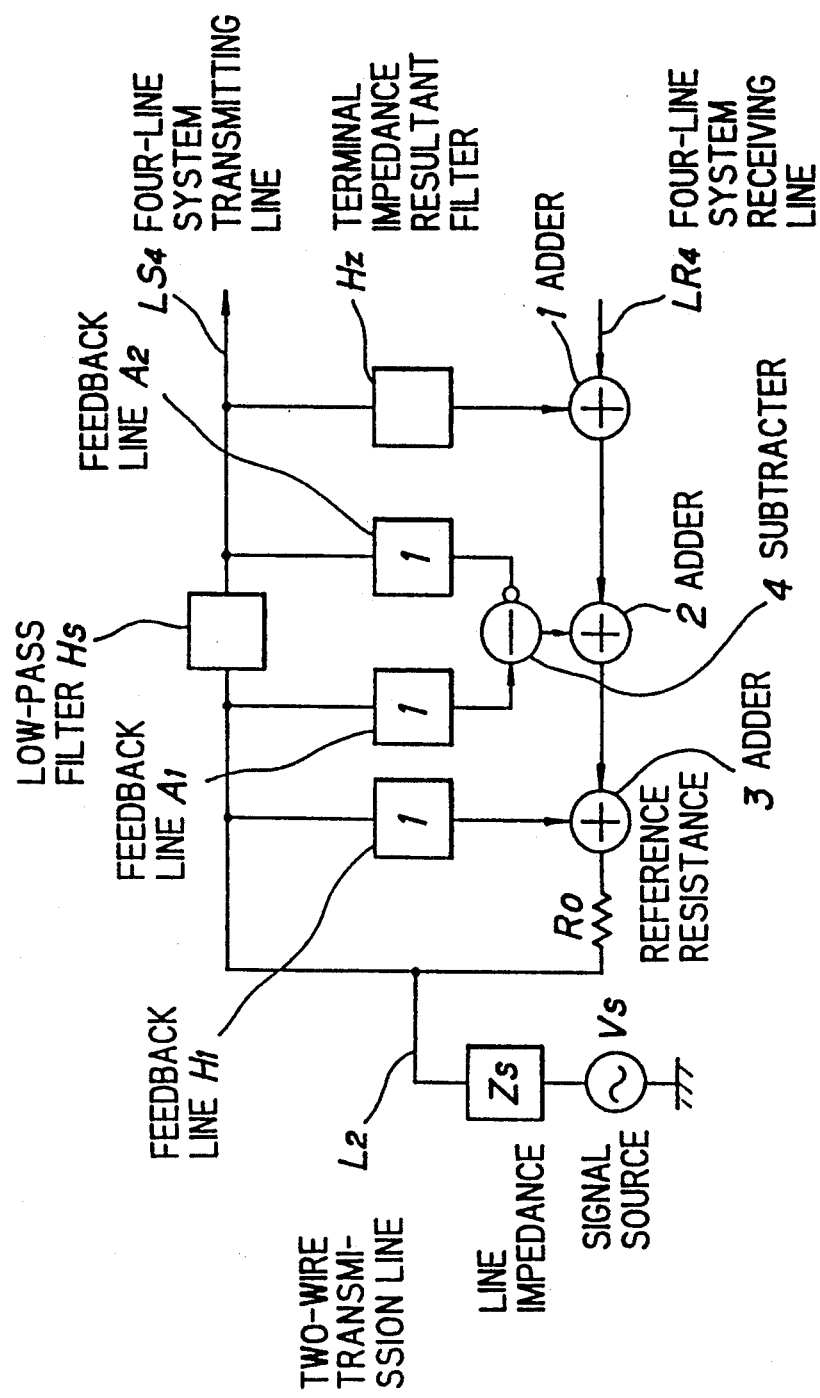
FIGS. 4 and 5 are block diagrams showing termination circuits for a two-wire transmission line in first and second preferred embodiments according to the invention.
Figure 5:
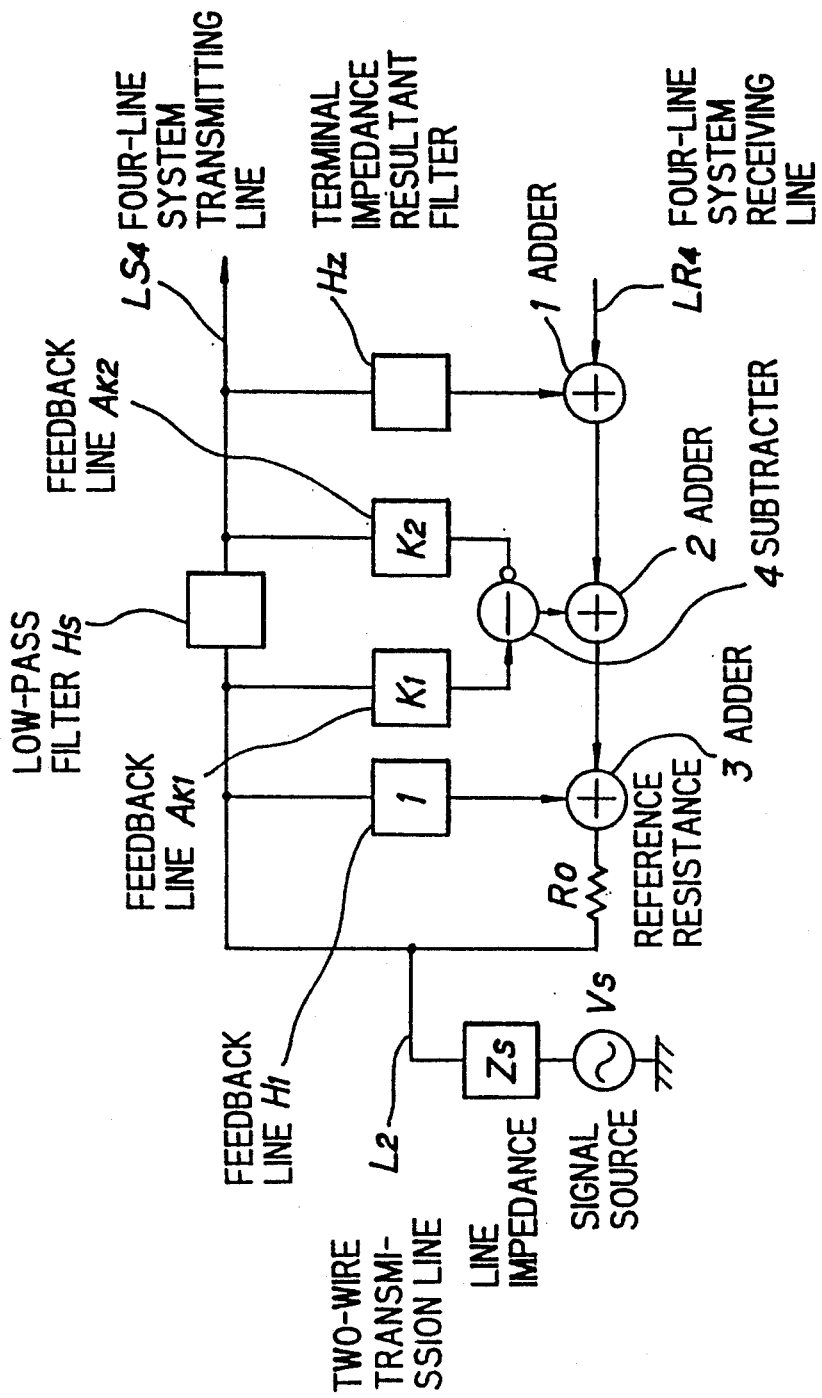

FIG. 5 shows a termination circuit for a two-wire transmission line in the second preferred embodiment according to the invention, wherein like parts are indicated by like reference numerals and symbols as used in FIG. 4, except that feedback lines $A_{k1}$ and $A_{k2}$ having feedback amounts $K_1$ and $K_2$ are used in place of the first and second feedback lines $A_1$ and $A_2$.

In operation, if it is assumed that a characteristic is flat in a frequency band of the low-pass filter Hs, a loop including the feedback lines $A_{k1}$ and $A_{k2}$ provides a feedback equivalent to a difference between the feedback amounts $K_1$ and $K_2$ in the frequency band. In addition, a feedback loop is provided by the feedback line $H_1$ of a high impedance and the terminal impedance resultant filter Hz.

Thus, the best return-loss characteristic is obtained, the following equation (2) is met.

$$Hz + K_1 - K_2 = -Ro/Zs \qquad (2)$$

On the other hand, an output signal of the low-pass filter Hs is rotated in phase in a high frequency band by 180°. As a result, a feedback of the terminal impedance resultant filter Hz is turned from negative to positive. Simultaneously, a feedback of the feedback line $A_{k2}$ is turned to be negative, and supplied to the subtracter 4 together with a negative feedback of the feedback line $A_{k1}$, so that operation is maintained to be stable.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A termination circuit for a two-wire transmission line, comprising:
    a low-pass filter connected in series to a four-wire transmitting line for transmitting a signal supplied from a two-wire transmission line;
    a serial connection of first to third adders and a reference resistance connected to a four-wire receiving line for supplying a receipt signal to said two-wire transmission line;
    a terminal impedance resultant filter including a switched capacitor and having an input terminal connected to an output terminal of said low-pass filter and an output terminal connected to an input terminal of said first adder;
    first and second feedback lines having first and second feedback amounts and connected to an input terminal and an output terminal of said low-pass filter, respectively;
    a subtractor having first and second input terminals connected to said first and second feedback lines, respectively and an output terminal connected to said second adder; and
    a third feedback line having one end connected to said input terminal of said low-pass filter.

2. A termination circuit for a two-wire transmission line, according to claim 1, wherein:
    said first and second feedback lines have a feedback amount of "1", respectively.

3. A termination circuit for a two-wire transmission line, according to claim 1, wherein:
    said first and second feedback lines have feedback amounts of $K_1$ and $K_2$, where said $K_1$ and $K_2$ are arbitrary values.

* * * * *